US008640298B2

(12) United States Patent
Schrader

(10) Patent No.: US 8,640,298 B2
(45) Date of Patent: Feb. 4, 2014

(54) WIPER LIFTER

(75) Inventor: Michael A. Schrader, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 486 days.

(21) Appl. No.: 12/644,320

(22) Filed: Dec. 22, 2009

(65) Prior Publication Data
US 2011/0146021 A1    Jun. 23, 2011

(51) Int. Cl.
*B60S 1/02*    (2006.01)

(52) U.S. Cl.
USPC ................... 15/250.19; 15/257.01; 15/250.16

(58) Field of Classification Search
USPC ............. 15/250.19, 250.16, 257.01; 264/273; 254/88, 104
See application file for complete search history.

(56) References Cited

U.S. PATENT DOCUMENTS

| | | | |
|---|---|---|---|
| 4,345,352 A | | 8/1982 | Terabayashi |
| 4,952,430 A * | | 8/1990 | Bowser et al. ................... 428/34 |
| 4,969,228 A * | | 11/1990 | Edwards et al. ............ 15/250.19 |
| 5,035,023 A * | | 7/1991 | Slingerland, Jr. .......... 15/250.19 |
| 5,101,531 A * | | 4/1992 | Edwards et al. ............ 15/250.19 |
| 5,263,759 A * | | 11/1993 | Brodie et al. ................. 296/84.1 |
| 5,321,911 A * | | 6/1994 | Dickinson ....................... 49/404 |
| 5,675,861 A | | 10/1997 | Ayers |
| 6,253,409 B1 | | 7/2001 | Terai |
| 6,464,920 B1 * | | 10/2002 | Kramer ......................... 264/243 |
| 6,623,688 B2 | | 9/2003 | Gedritis et al. |
| 6,751,825 B2 | | 6/2004 | Zuccaro et al. |
| 6,802,101 B2 | | 10/2004 | Egner-Walter |
| 7,887,731 B2 * | | 2/2011 | Schmeisser et al. .......... 264/255 |
| 2005/0198761 A1 * | | 9/2005 | Baskerville et al. ........ 15/250.19 |
| 2008/0289137 A1 * | | 11/2008 | Ciaccio et al. ............. 15/250.201 |

FOREIGN PATENT DOCUMENTS

| | | | | |
|---|---|---|---|---|
| GB | 2281506 A | * | 3/1995 | ................ B60S 1/04 |
| JP | 11034807 | * | 2/1999 | ................ 15/250.19 |

* cited by examiner

*Primary Examiner* — Joseph J Hail
*Assistant Examiner* — Henry Hong
(74) *Attorney, Agent, or Firm* — Clifford B. Vaterlaus; Emerson Thomson Bennett, LLC

(57) ABSTRACT

A wiper lifter assembly may include a wiper ramp that lifts a wiper away from a wiper surface on a vehicle, an isolation pad for attaching the assembly to the vehicle, and a wiper contact member that is attached to an upper surface of the wiper ramp. The wiper ramp may be formed of a first material while the wiper contact member and the isolation pad may be both formed of a second material that is softer than the first material.

19 Claims, 8 Drawing Sheets

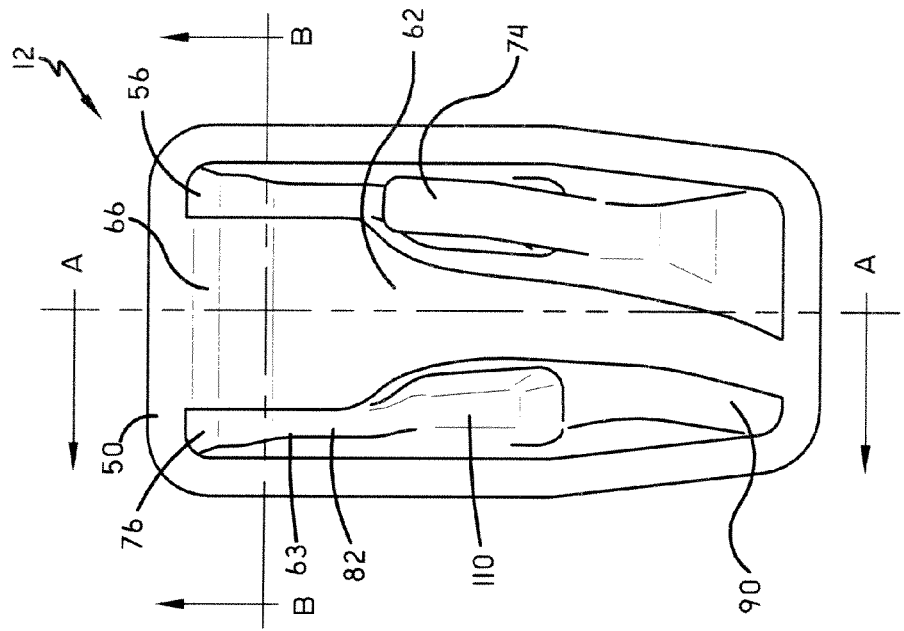
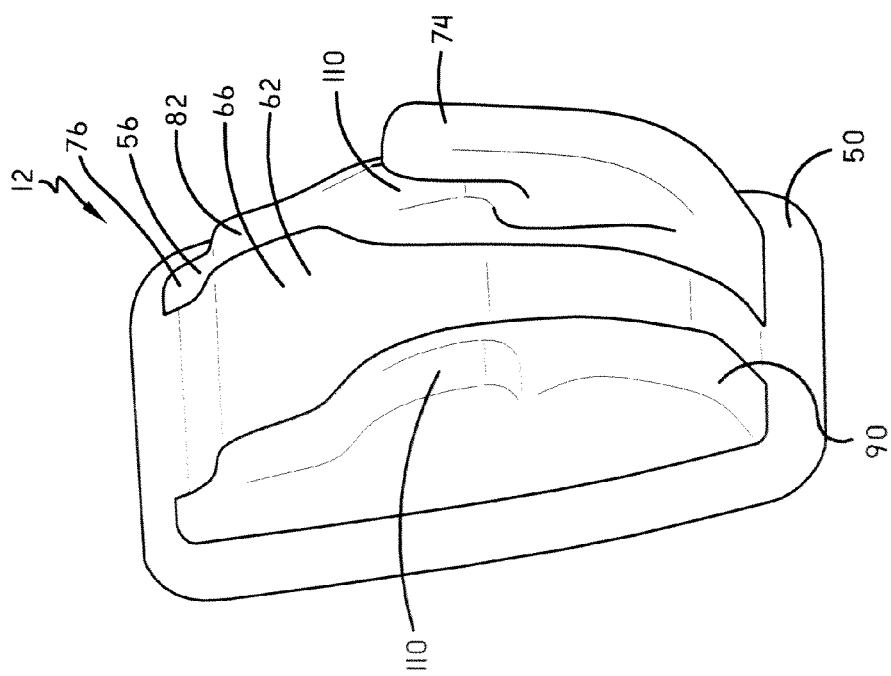

WIPER LIFTER

I. BACKGROUND

A. Field of Invention

This invention pertains to the art of methods and apparatuses related to vehicle surface cleaning and more specifically to methods and apparatus related to windshield wipers.

B. Description of the Related Art

It is well known in the art to provide vehicles with devices commonly referred to as "windshield wipers" that are operated to clean and/or clear the front and sometimes the back window or windshield through which vehicle passengers look. Such windshield wipers are typically pivoted across a portion of the outer surface of the windshield where they clear or wipe the windshield surface to remove water, snow, ice or debris.

It is also well known to place windshield wipers in a non-use or "park" position when they are not being used. Often, the windshield wipers are positioned onto a wiper lifter, sometimes referred to as a ramp, to maintain the wiper in the parked position. Typically, placing the wiper onto the wiper lifter lifts the wiper away from the windshield and/or vehicle surface and thereby relieves unwanted pressure from the wiper.

Many know wiper lifters are formed of two parts, a relatively soft base or isolation pad (typically formed of rubber) that seals the lifter to the vehicle and a harder skid pad (typically formed of a plastic) that the wiper contacts when it is placed into the parked position. While known two part wiper lifters generally work well for their intended purpose, they have a disadvantage. In particular, when wipers are parked onto known wiper lifters a loud "thunk" or "thud" noise occurs. This noise is undesirable.

One known wiper lifter is designed to support a wiper in a park position and do so without the unwanted noise. This known wiper lifter is subject to U.S. patent application Ser. No. 12/341,508 which is fully incorporated herein by reference and which is owned by the assignee of this patent application. FIG. 10 illustrates this wiper lifter 1 which includes a wiper ramp 2 that has an upper surface 3 that maintains a wiper (not shown) in a parked position. An isolation pad 4 is attached to a bottom surface of the wiper ramp 2 and seals the wiper lifter 1 to a vehicle (not shown). The wiper lifter 1 also includes a wiper contact member 5 that is attached to a portion of the upper surface 3 of the wiper ramp 2 and that is used as the first part of the wiper lifter 1 that is contacted by the wiper when the wiper is moved into the parked position.

The wiper lifter 1 works well for its intended purpose. A disadvantage, however, is that the wiper lifter 1 is relatively complex and thus relatively expensive to manufacture. This is due to the fact that the wiper lifter 1 is composed of four distinct parts which are each formed of distinct materials and which require manual assembly. The first part is the wiper ramp 2 which is typically formed of a thermoplastic composite comprising glass fibers and nylon. The second part is the isolation pad 4 which is typically formed of a thermo plastic elastomer (TPE) and which is manually attached to the bottom surface of the wiper ramp 2. The wiper contact member 5 is the combination of two parts: a third part which is a foam tape and a fourth part which is a low friction protective top layer. The third and fourth parts are then manually attached to the top surface of the wiper ramp 2.

Therefore, what is needed is a wiper lifter that supports a wiper in a park position, does so without the unwanted noise and, is easier and less expensive to manufacture than known wiper lifters.

II. SUMMARY

According to one embodiment of this invention, a wiper lifter assembly, for use with an associated vehicle having a wiper and a wiping surface, comprises: a wiper ramp having: (1) an upper surface including a ramped portion for lifting the associated wiper away from the associated wiping surface; and, (2) a lower surface; a wiper contact member positioned on the upper surface of the wiper ramp such that the associated wiper contacts the wiper contact member before contacting any other part of the wiper lifter assembly; and, an isolation pad having: (1) a first surface that contacts the lower surface of the wiper ramp; and, (2) a second surface for contacting a surface of the associated vehicle. The wiper ramp may be formed substantially of a first material while the wiper contact member and the isolation pad may be both formed substantially of a second material that is substantially softer than the first material.

According to another embodiment of this invention, a method comprises the steps of: (A) forming a wiper ramp substantially of a first material to have an upper surface and a lower surface, where the upper surface includes a ramped portion for lifting an associated wiper away from an associated wiping surface of an associated vehicle; (B) forming a wiper contact member substantially of a second material; (C) forming an isolation pad substantially of the second material to have first and second surfaces; (D) attaching the first surface of the isolation pad onto the lower surface of the wiper ramp where the second surface of the isolation pad is attachable to a surface of the associated vehicle; and, (E) attaching the wiper contact member onto the upper surface of the wiper ramp such that the associated wiper contacts the wiper contact member before contacting the wiper ramp and before contacting the isolation pad.

According to yet another embodiment of this invention, an apparatus for use with an associated vehicle having a wiping surface comprises: a wiper assembly comprising: (A) a wiper blade mount that is pivotally attachable to the associated vehicle; (B) a wiper blade supported to the wiper blade mount; (C) wherein the wiper assembly is adjustable between: (1) a use condition where the wiper blade mount moves the wiper blade to wipe the associated wiping surface; and, (2) a parked condition where the wiper blade mount does not move the wiper blade; and, a wiper lifter assembly comprising: (A) a wiper ramp having: (1) an upper surface including a ramped portion that lifts the wiper blade away from the associated wiping surface when the wiper assembly is in the parked condition; and, (2) lower surface; (B) a wiper contact member positioned on the upper surface of the wiper ramp, wherein the wiper blade contacts the wiper contact member before contacting any other part of the wiper lifter assembly as the wiper assembly is adjusted from the use condition to the parked condition; and, (C) an isolation pad having: (1) a first surface that contacts the lower surface of the wiper ramp; and, (2) a second surface that is attachable to the associated vehicle. The wiper ramp may be formed substantially of a first material and the wiper contact member and the isolation pad may both be formed substantially of a second material that is substantially softer than the first material.

One advantage of this invention is that a wiper lifter supports a wiper in a park position and does so without unwanted noise.

Another advantage of this invention is that a wiper lifter is relatively easy to manufacture.

Another advantage of this invention is that a wiper lifter is relatively inexpensive to manufacture.

III. BRIEF DESCRIPTION OF THE DRAWINGS

Still other benefits and advantages of the invention will become apparent to those skilled in the art to which it pertains upon a reading and understanding of the following detailed specification.

The invention may take physical form in certain parts and arrangement of parts, embodiments of which will be described in detail in this specification and illustrated in the accompanying drawings which form a part hereof and wherein:

FIG. 5 is a perspective view of the wiper lifter assembly shown in FIG. 4 without the wiper.

FIG. 6 is a plan view of the wiper lifter assembly shown in FIG. 5.

IV. DETAILED DESCRIPTION

Figure 1:
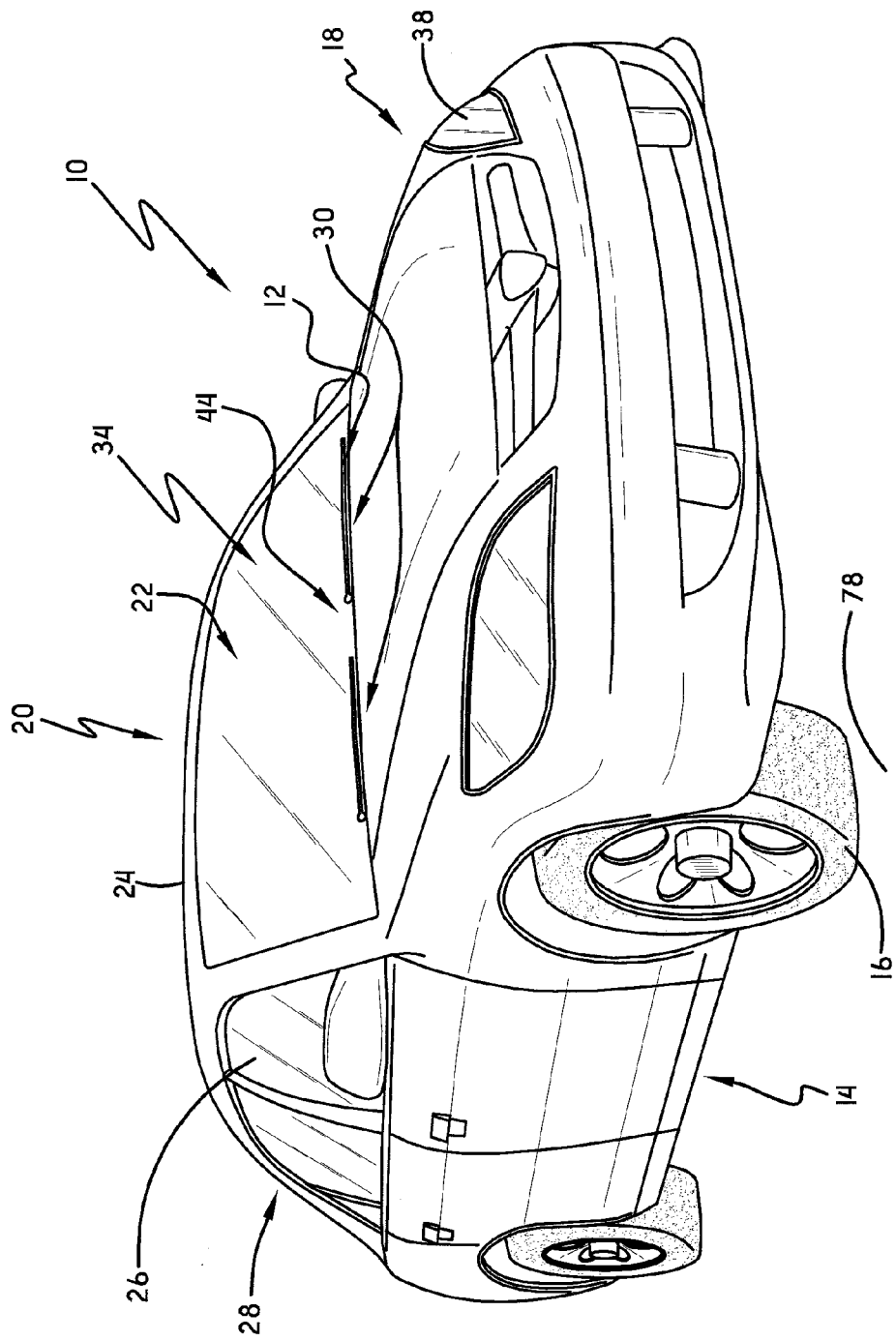
FIG. 1 is a front perspective view of a sedan.
Figure 2:
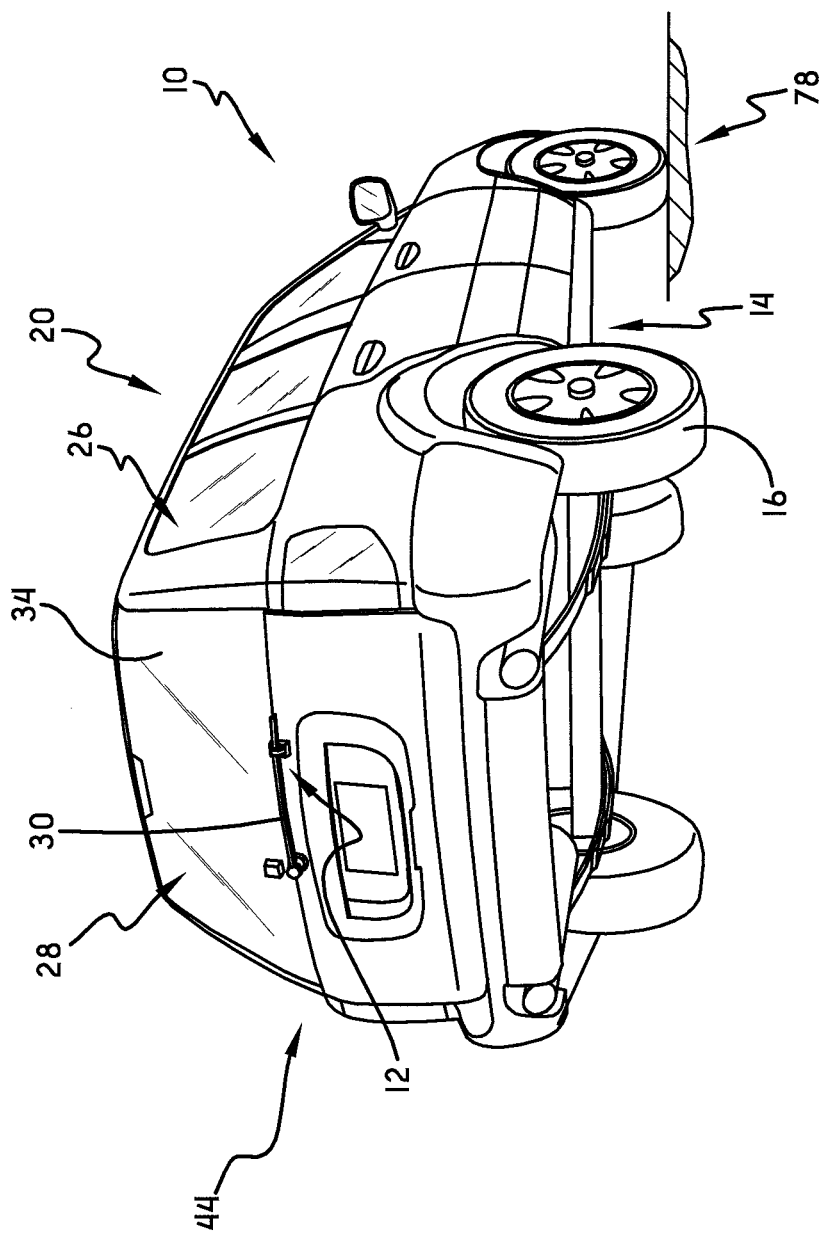
FIG. 2 is a rear perspective view of a sports utility vehicle (SUV).

Referring now to the drawings wherein the showings are for purposes of illustrating embodiments of the invention only and not for purposes of limiting the same, and wherein like reference numerals are understood to refer to like components, FIGS. 1 and 2 each show a vehicle 10 that may be equipped with a wiper lifter assembly 12, according to one embodiment of this invention. While the vehicle 10 shown in FIG. 1 is a sedan and the vehicle shown in FIG. 2 is a sports utility vehicle (SUV), it is to be understood that the wiper lifter assembly 12 of this invention will work with any vehicle including, for some non-limiting examples, cars, trucks, motorcycles, aircraft and sea-faring vessels. The vehicle 10 may include a frame 14, one or more ground engaging wheels 16 mounted to the frame 14, and a locomotion source 18, mounted to the frame 14, for use in providing locomotion for the vehicle 10. The locomotion source could be of any type chosen with the sound judgment of a person of skill in the art including, for some non-limiting examples, an internal combustion engine (ICE), an electric motor, and a so called "hybrid" which combines an ICE with an electric motor.

With continuing reference to FIGS. 1-2, each vehicle 10 may also have a passenger compartment 20 which houses one or more passengers as is well known in the art. The passenger compartment 20 may be bordered by a front windshield 22, a roof 24, one or more side windows 26 and a rear windshield or window 28. The vehicle also may include at least one wiper assembly 30, which is used to wipe and thereby clean or clear a wiping surface 34 on the vehicle 10. While the wiper assembly 30 will be described in further detail below, it is to be understood that this invention can be used with any wiper assembly chosen with the sound judgment of a person of skill in the art. Similarly, while the wiping surface 34 shown in FIG. 1 is the outer surface of the front windshield 22 and the wiping surface 34 shown in FIG. 2 is the outer surface of the rear windshield 28, it is to be understood that this invention can be used with a wiper assembly used to wipe any vehicle wiping surface chosen with the sound judgment of a person of skill in the art. Some additional non-limiting examples of vehicle wiping surfaces include the exterior surfaces of the side windows 26 and the exterior surface of an illumination device such as a headlight 38.

Figure 3:
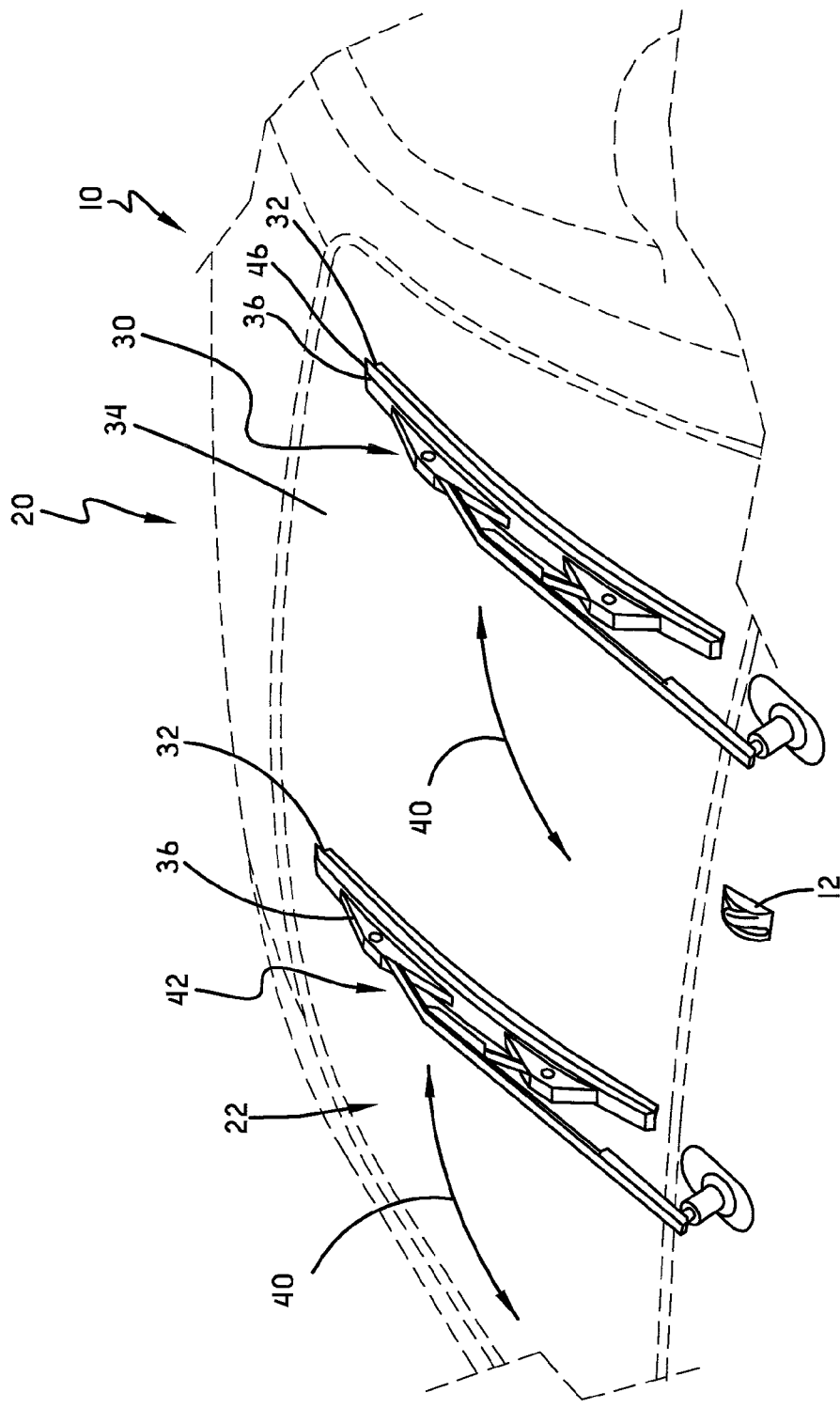
FIG. 3 is a perspective view of the front windshield of a vehicle illustrating the operation of a windshield wiper assembly.
Figure 4:
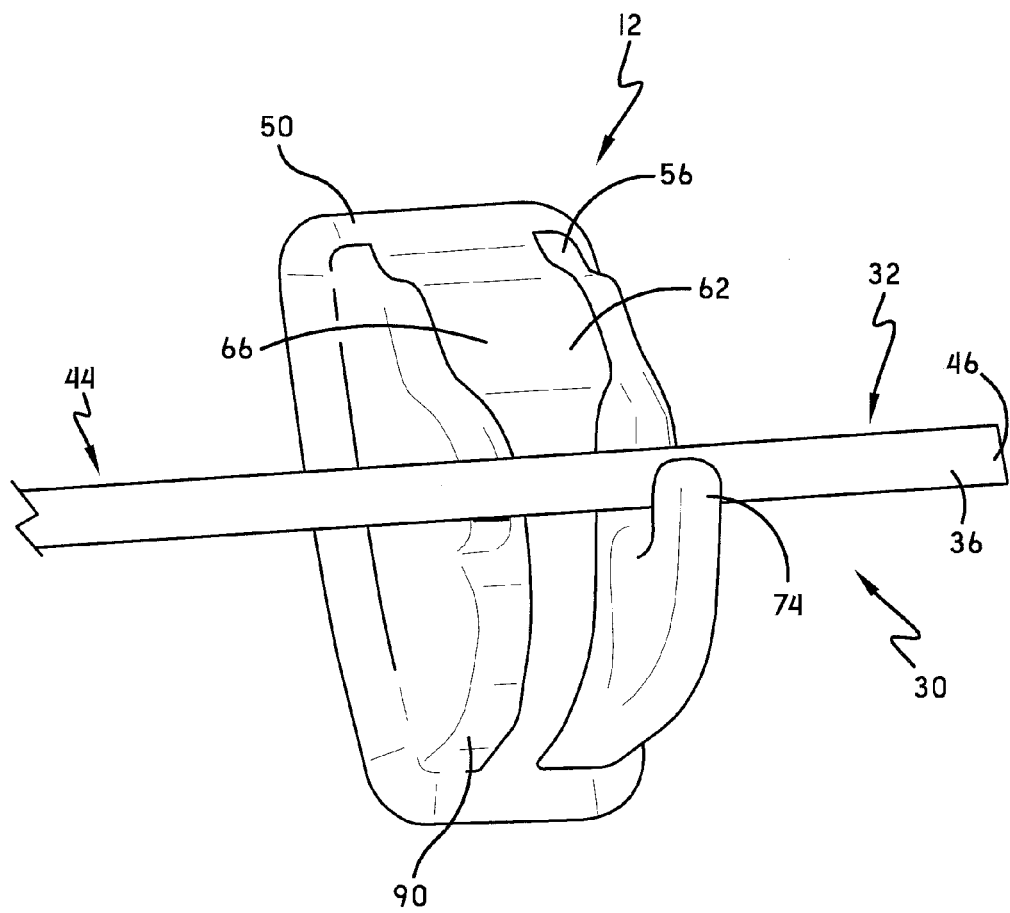
FIG. 4 is a perspective view of a wiper parked onto a wiper lifter assembly according to one embodiment of this invention.
Figure 7:
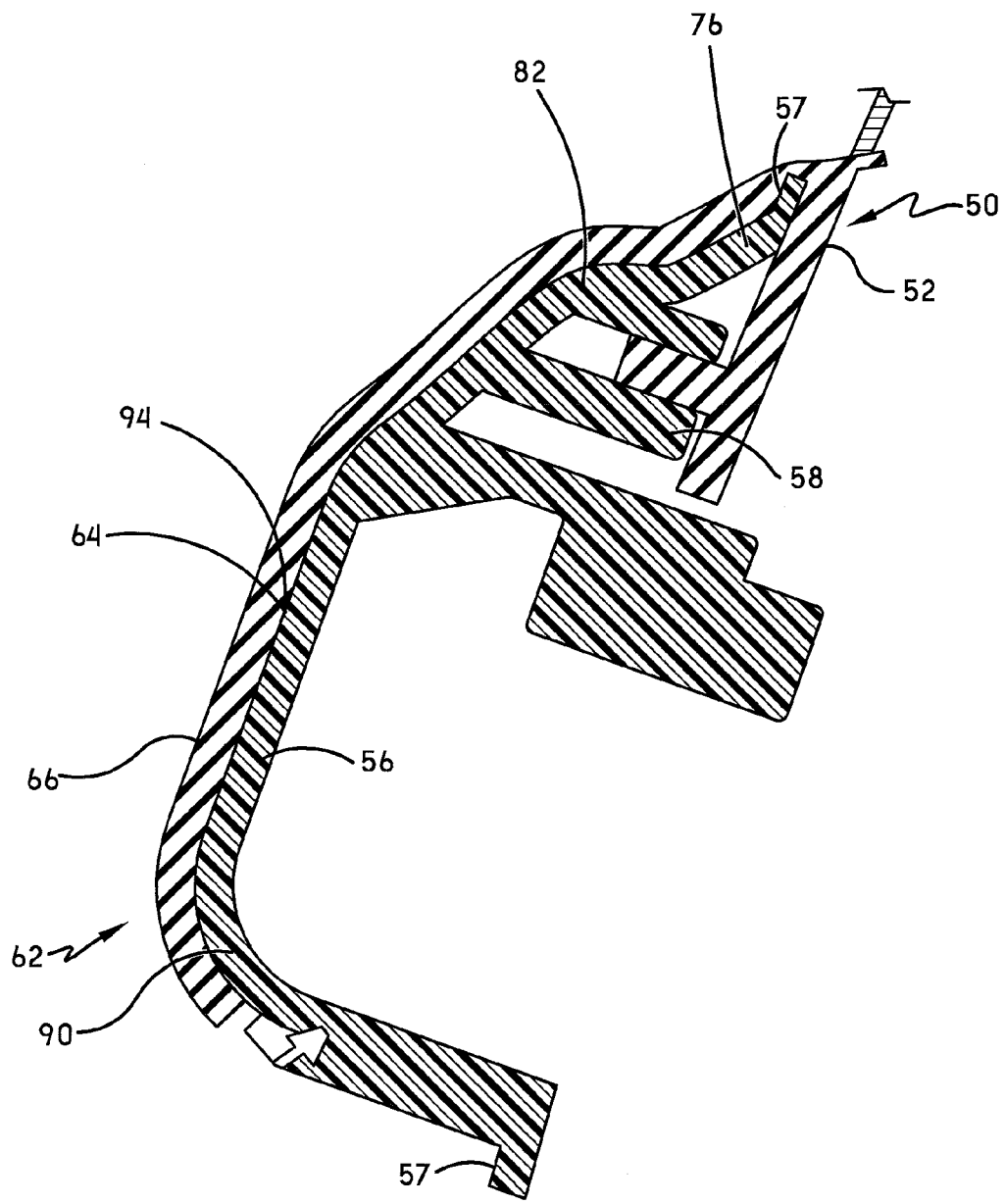
FIG. 7 is a cross-sectional view of the wiper lifter assembly taken along the line A-A in FIG. 6.
Figure 8:
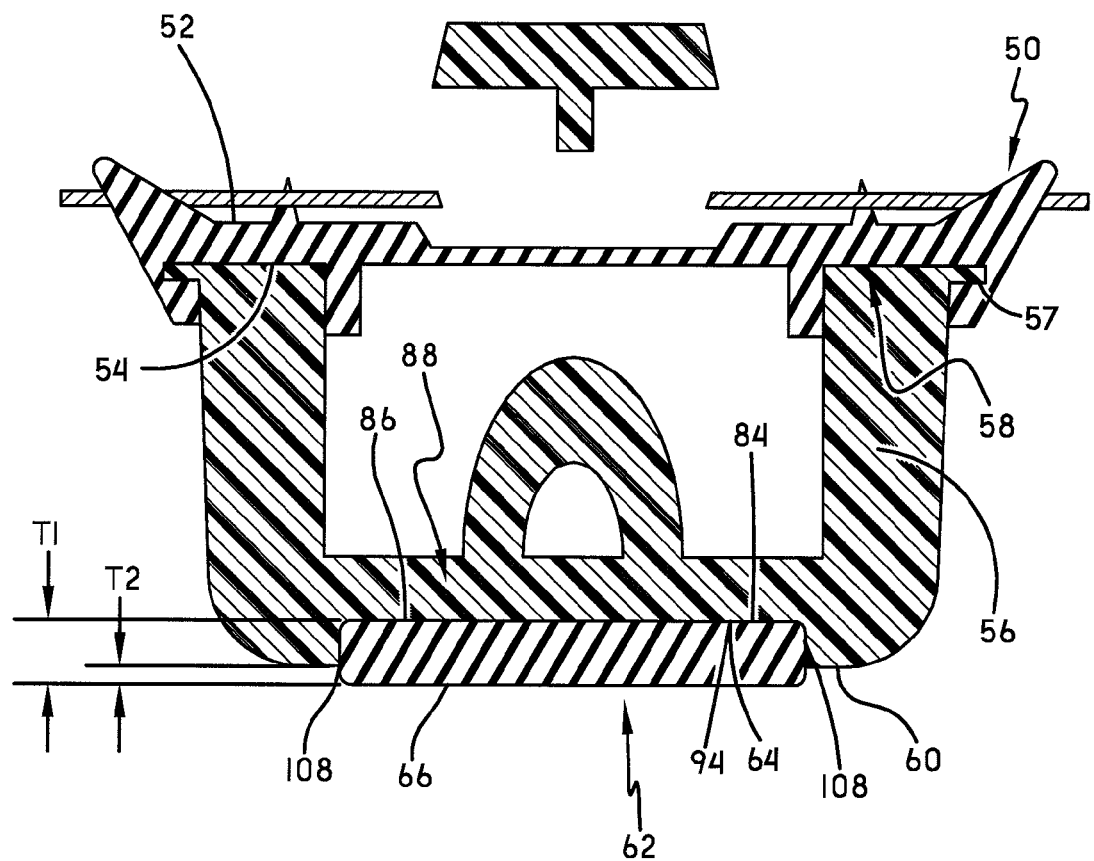
FIG. 8 is a cross-sectional view of the wiper lifter assembly taken along the line B-B in FIG. 6.
Figure 10:
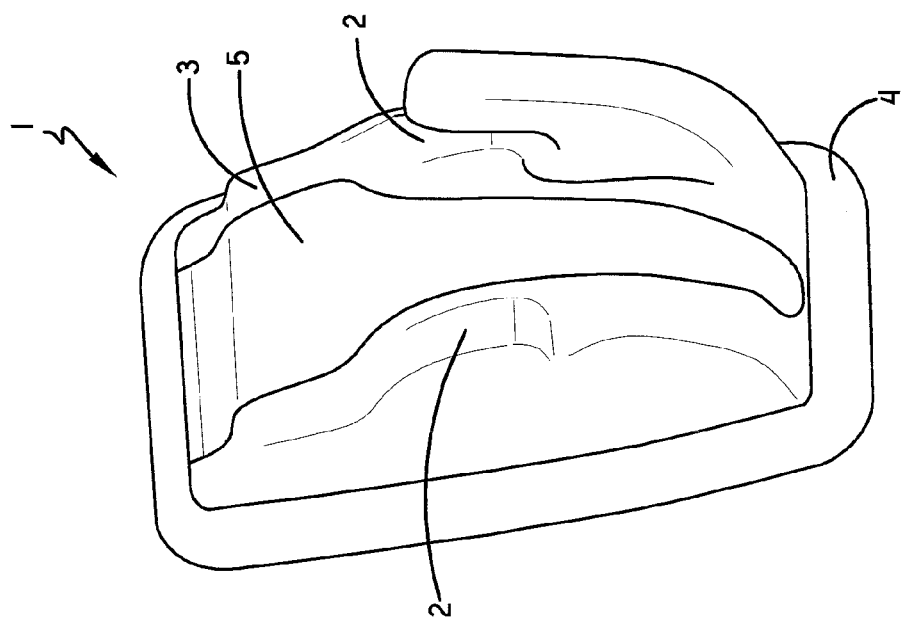
FIG. 10 is a perspective view of a prior art wiper lifter assembly.
Figure 9:
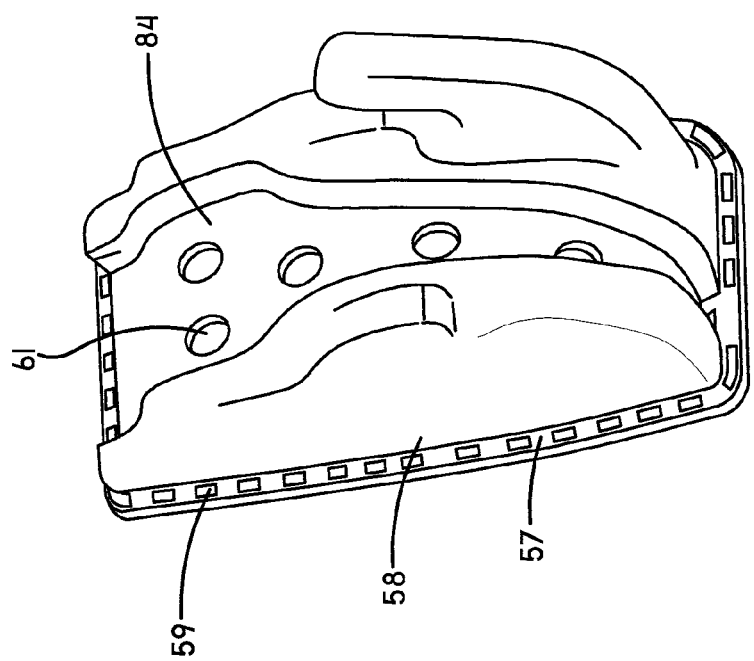
FIG. 9 is a perspective view of a wiper ramp.

With reference now to FIGS. 1-3, the wiper assembly 30 may include a wiper blade 32, which contacts and wipes the wiping surface 34, and a wiper blade mount 36 to which the wiper blade 32 is attached and supported. The wiper blade mount 36 may be pivotally connected to the vehicle 10 so that the wiper blade 32 may move within a predetermined angle 40 on wiping surface 34. The wiper assembly 30 may be in a first use or extended condition 42 (shown in FIG. 3) or a second non-use or parked condition 44 (shown in FIGS. 1 and 2). When the wiper assembly 30 is automatically or manually activated, wiper assembly 30 may move from the parked condition 44 to the extended condition 42. In the extended condition 42, wiper assembly 30 may move within the predetermined angle 40 in a reciprocating motion. When the wiper assembly 30 is automatically or manually deactivated, the wiper assembly 30 may move from the extended condition 42 to the parked condition 44, where the wiper assembly 30 is positioned or parked on the wiper lifter assembly 12. While the parked condition 44 shown is below the wiping surface 34, it should be understood that the parked condition 44 can be at any location chosen with the sound judgment of a person of skill in the art. As the apparatuses and methods for moving wiper assemblies are well known in the art, details will not be provided here.

With reference now to FIGS. 1-4, the components of the wiper lifter assembly 12 will now be described. First it should be noted that while the wiper lifter assembly shown is used to support a cantilevered end 46 of the wiper assembly 30, it may be positioned to support any portion of the wiper assembly chosen with the sound judgment of a person of skill in the art. Also, while one wiper lifter assembly 12 is shown for use with one wiper assembly 30, it should be understood that multiple wiper lifter assemblies 12 may be used with a single wiper assembly 30. The wiper lifter assembly 12 may include an isolation pad 50, a wiper ramp 56, and a wiper contact member 62.

With reference to FIGS. 1-6, isolation pad 50 may form a foundation or base for the wiper lifter assembly 12 and may be attached to vehicle 10 near wiping surface 34 in any manner chosen with the sound judgment of a person of skill in the art. The isolation pad 50 may form a watertight seal or barrier between the wiper lifter assembly 12 and the vehicle 10. The wiper lifter assembly 12 may also be integrated into a specific body panel on the vehicle 10 or passenger compartment 20. The integration may prevent moisture from entering between the wiper lifter assembly 12 and the vehicle 10, thus preventing harmful oxidation and damage. The integration of wiper lifter assembly 12 may further provide a more secure attachment to vehicle 10. In one embodiment, a body panel may be manufactured with a cavity or recess sized to receive wiper lifter assembly 12. Isolation pad 50 may have any shape chosen with sound judgment by a person skilled in the art. In one embodiment, the isolation pad 50 may be generally rectangular in shape, as shown. In other embodiments, the isolation pad 50 may be circular or elliptical With reference now to FIGS. 3-8, the isolation pad 50 may have a first surface 52 operatively connected to vehicle 10 and a second surface 54 operatively connected to wiper ramp 56.

First surface 52 may form a secure connection between the vehicle 10 and isolation pad 50. First surface 52 may also form a watertight seal between isolation pad 50 and vehicle 10. In one embodiment, the isolation pad 50 may be attached to the vehicle 10 by a mechanical fastener 70. Mechanical fastener 70 can be a bolt, screw, rivet, or any other fastener chosen with the sound judgment of a person of skill in the art. In another embodiment, the first surface 52 may use an adhesive to attach to the vehicle 10.

With reference now to FIGS. 3-9, the wiper ramp 56 determines the location and orientation of wiper assembly 30 in relation to vehicle 10 when the wiper assembly 30 is in the parked condition 44. The wiper ramp 56 may have a first surface 58, which may operatively connect to second surface 54 of the isolation pad 50, a second surface 60, which may lift wiper assembly 30 away from wiping surface 34, and a third surface 84, which may operatively connect to wiper contact member 62. The first surface 58 may include a rim 57 to assist with the connection to the isolation pad 50. The first surface 58 may also have at least one hole 59 formed therein. In one embodiment, shown, the hole(s) 59 are formed in the rim 57. The third surface 84 may have at least one hole 61, two shown, formed therein. The holes 59, 61 may be placed in any location and formed of any size and shape chosen with the sound judgment of a person of skill in the art. While the holes 59, 61 are not required for this invention, their purpose will be described further below.

With continuing reference to FIGS. 3-9, the second surface 60 of the wiper ramp 56, which lifts wiper assembly 30 away from wiping surface 34; may have a leading edge 76 located near wiping surface 34. Leading edge 76 may take any shape chosen with the sound judgment of a person of skill in the art. Leading edge 76 may be the portion of second surface 60 where the wiper assembly 30 first contacts the wiper ramp 56. Second surface 60 may also have a contoured edge 82 located near leading edge 76. In one embodiment, contoured edge 82 is located adjacent to leading edge 76. Contoured edge 82 may also take any shape chosen with the sound judgment of a person of skill in the art. Leading edge 76 may form a surface leading from wiping surface 34 to contoured edge 82. Second surface 60 of wiper ramp 56 may have a lifter holder 74 located near contoured edge 82. In one embodiment, lifter holder 74 may be located adjacent to contoured edge 82. Lifter holder 74 may have any shape chosen with the sound judgment of a person of skill in the art. In one embodiment, lifter holder 74 may be a raised or elevated portion on second surface 60. In other embodiments, lifter holder 74 may have a general J-shape, C-shape, or U-shape. The lifter holder 74 may secure wiper assembly 30 to wiper lifter assembly 12 in the parked condition 44. In one embodiment, second surface 60 includes a generally sloping surface or ramped portion 63, as shown. The ramped portion 63 can be positioned in any location chosen with the sound judgment of a person of skill in the art. The ramped portion 63 may be positioned, for example, on leading edge 76 and/or contoured edge 82.

Still referring to FIGS. 3-9, second surface 60 of wiper ramp 56 may have a ridge 110 near the contoured edge 82. In one embodiment, ridge 110 may be located adjacent to contoured edge 82 and on the same latitudinal axis as the lifter holder 74. Ridge 110 may have any shape chosen with the sound judgment of a person of skill in the art. In one embodiment, ridge 110 may be a raised or elevated portion on second surface 60. Second surface 60 may have more than one ridge 110. In one embodiment, second surface 60 has two ridges 110. Contoured edge 82 may form a surface extending from leading edge 76 to ridge 110 and lifter holder 74. Second surface 60 may also have a trailing edge 90 located near ridge 110 and lifter holder 74. In one embodiment, trailing edge 90 may be located adjacent to ridge 110 and lifter holder 74. Trailing edge 90 may have any shape chosen with the sound judgment of a person of skill in the art. In one embodiment, trailing edge 90 is a generally sloping surface extending from ridge 110 and lifter holder 74 to vehicle 10. In another embodiment, wiper assembly 30 does not contact trailing edge 90.

With reference now to FIGS. 4-9, third surface 84 of wiper ramp 56 may be sized and positioned in any manner chosen with the sound judgment of a person of skill in the art. In one embodiment, the third surface 84 may be centered along the longitudinal axis of the wiper ramp 56. Third surface 84 may be located below the second surface 60 of the wiper ramp 56, as shown. In one embodiment, the third surface 84 may lie in a depression or groove 88 defined by a bottom 86 and sides 108. Bottom 86 may be located below second surface 60. Sides 108 may join with the bottom 86 and may be substantially perpendicular to the second surface 60. The groove 88 may have a width that is relatively wider at the leading edge 76 of the wiper ramp 56 and then becomes relatively narrower at the trailing edge 90 of the wiper ramp 56. In another embodiment, the third surface 84 is simply a section or portion of the second surface 60.

With continuing reference to FIGS. 4-9, the wiper contact member 62 may act as a sound damper to greatly reduces the "thunk" or "thud" noise known in the prior art. Wiper contact member 62 may have any position chosen with the sound judgment of a person of skill in the art to maximize the sound damping characteristic of the wiper lifter assembly 12. In one embodiment, wiper contact member 62 may be positioned so that wiper assembly 30 contacts wiper contact member 62 before any other portion of wiper lifter assembly 12. Wiper contact member 62 may have any overall thickness T1 chosen with sound judgment of a person skilled in the art. In one embodiment, overall thickness T1 may be from 0.5 to 5.0 millimeters. In another embodiment, overall thickness T1 may be from 1.0 to 2.0 millimeters. In a more specific embodiment, overall thickness T1 may be approximately 1.6 millimeters. Wiper contact member 62 may have a first surface 64 that operatively connects to the third surface 84 of the wiper ramp 56 and a second surface 66.

With reference now to FIGS. 1-9, second surface 66 of wiper contact member 62 may receive wiper assembly 30 when wiper assembly 30 moves from the extended condition 42 to the parked condition 44. Second surface 66 may be located near leading edge 76 of wiper ramp 56. In one embodiment, second surface 66 is adjacent to leading edge 76. Wiper contact member 62 may extend beyond at least a portion of wiper ramp 56 by an extending thickness T2. In one embodiment, second surface 66 of wiper contact member 62 may extend above at least a portion of second surface 60 of wiper ramp 56 by extending thickness T2. In another embodiment, second surface 66 may extend beyond leading edge 76 by extending thickness T2. In still another embodiment, second surface 66 may extend beyond second surface 60 along leading edge 76 and contoured edge 82 by extending thickness T2. Extending thickness T2 may be any thickness chosen with sound judgment of a person skilled in the art. In one embodiment, extending thickness T2 may be from 0 to 2.0 millimeters. In another embodiment, extending thickness T2 may be from 0.05 to 0.15 millimeters. In a more specific embodiment, extending thickness T2 may be approximately 0.1 millimeters. The ratio between extending thickness T2 and overall thickness T1 (for example, T2/T1) of wiper contact member 62 may be any ratio from zero to one. In one embodiment, extending thickness T2 is substantially equal to overall thickness T1, thus resulting in a T2/T1 ratio substantially equal to 1. In another embodiment, T2 is substantially equal to 0, thus resulting in a T2/T1 ratio substantially equal to 0. In a more specific embodiment, T1 may be approximately 1.6 millimeters and T2 may be approximately 0.1 millimeters, thus resulting in a T2/T1 ratio approximately equal to 0.0625. In each of these embodiments, wiper assembly 30 may first contact second surface 66 before any other portion of wiper lifter assembly 12 when moving from extended condition 42 to parked condition 44.

With continuing reference to FIGS. 1-9, the materials and methods that may be used to manufacture the wiper lifter assembly 12 will now be described. The wiper ramp 56 may be formed of any material chosen with sound judgment by a person skilled in the art. In one embodiment, the wiper ramp 56 may be substantially formed of a relatively hard material, such as plastic. In one specific embodiment, the wiper ramp 56 is formed of a thermoplastic composite comprising glass fibers and nylon (sometimes referred to as GF Nylon or Glass Fiber Nylon or Glass Filled Nylon). The thermoplastic wiper ramp 56 may be formed, in one embodiment, in an injection molding process.

With continuing reference to FIGS. 1-9, the isolation pad 50 and the wiper contact member 62 may be formed of the same (homogeneous) material which may be any material chosen with sound judgment by a person skilled in the art. In one embodiment, the material used to form the isolation pad 50 and the wiper contact member 62 is softer than the material used to from the wiper ramp 56. In one specific embodiment, the isolation pad 50 and the wiper contact member 62 are formed of a silicone copolymer. The silicone copolymer may provide long term durability and/or a low coefficient of friction. It may also provide sound absorbing characteristics. The silicone copolymer may be, in one non-limiting example, TPE Sarlink®.

Still referring to FIGS. 1-9, to manufacture the wiper lifter assembly 12, the isolation pad 50 and the wiper contact member 62 may be attached to the wiper ramp 56. Specifically, the second surface 54 of the isolation pad 50 may be attached to the first surface 58 of the wiper ramp 56 and the first surface 64 of the wiper contact member 62 may be attached to the third surface 84 of the wiper ramp 56. In one embodiment, the isolation pad 50 is overmolded onto the wiper ramp 56 and the wiper contact member 62 is overmolded onto the wiper ramp 56. In a more specific embodiment, the isolation pad 50 and the wiper contact member 62 are both overmolded onto the wiper ramp 56 in a single injection molding process. If the previously noted holes 59, 61 are formed in the wiper ramp 56, the material that forms the isolation pad 50 and/or the wiper contact member 62 can be inserted into the holes 59, 61 in any known manner to achieve a more secure attachment bond. If the previously noted groove 88 is formed in the wiper ramp 56, the material that forms the wiper contact member 62 can be inserted into the groove 88 in any known manner to achieve a more secure attachment bond. Once the wiper lifter assembly 12 has been formed, it may be attached to the vehicle 10 as a single unit.

With reference now to all the FIGURES, the process of parking the wiper assembly 30 on the wiper lifter assembly 12 will now be described. When wiper assembly 30 moves from the first use or extended condition 42 to the second non-use or parked condition 44, wiper assembly 30 may contact wiper lifter assembly 12. In one embodiment, wiper assembly 30 may first contact leading edge 76 of wiper ramp 56. In a more specific embodiment, wiper assembly 30 may first contact second surface 66 of wiper contact member 62 at leading edge 76. As wiper assembly starts to slide on second surface 66, leading edge 76 may lift wiper assembly 30 away from wiping surface 34. As wiper assembly 30 continues to move towards the parked condition 44, contoured edge 82 may continue to lift wiper assembly 30 away from wiping surface 34. Wiper assembly 30 may then contact ridge 110 as wiper assembly 30 continues to move towards the parked condition 44. Ridge 110 may move or lift wiper assembly 30 away from and out of contact with second surface 66. Wiper contact member 62 could prematurely degrade if wiper assembly 30 were to remain in contact with second surface 66 in the parked condition 44. Thus, ridge 110 may prolong the life of wiper contact member 62. Ridge 110 may also move or direct the wiper assembly 30 into lifter holder 74 as wiper assembly 30 continues to move to the parked condition 44. When wiper assembly 30 at least partially contacts lifter holder 74, wiper assembly 30 is in the parked condition 44. In one embodiment, wiper lifter assembly 12 may be mounted on vehicle 10 with leading edge 76 being the furthest part of the wiper lifter assembly 12 away from ground surface 78 so the force of gravity may assist in keeping the wiper assembly 30 in lifter holder 74. Ridge 110 may continue to keep wiper assembly 30 out of contact with wiper contact member 62 in the parked condition 44. Wiper assembly 30 may remain in the parked condition 44 until the wiper assembly 30 is activated. Once the wiper assembly 30 is activated, the process is reversed.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A wiper lifter assembly, for use with an associated vehicle having a wiper and a wiping surface, comprising:
  a wiper ramp having: (1) an upper surface including (a) a ramped portion for lifting the associated wiper away from the associated wiping surface; and (b) a groove with a depth; and, (2) a lower surface;
  a wiper contact member positioned on the upper surface of the wiper ramp such that the associated wiper contacts the wiper contact member directly and then the wiper ramp directly while overlapping the wiper contact member;
  an isolation pad having: (1) a first surface that contacts the lower surface of the wiper ramp; and, (2) a second surface for contacting a surface of the associated vehicle;
  wherein the wiper ramp is formed substantially of a first material;
  wherein the wiper contact member and the isolation pad are both formed substantially of a second material that is substantially softer than the first material;
  wherein the wiper contact member has a thickness T1, measured in a direction perpendicular to the wiper ramp upper surface at a location of measurement, that is greater than the depth of the groove; and
  wherein the wiper contact member is positioned in the groove such that the wiper contact member defines an extending thickness T2 extending beyond the upper surface of the wiper ramp.

2. The wiper lifter assembly of claim 1 wherein:
  the first material is a thermoplastic composite comprising glass fibers and nylon; and,
  the second material is a silicone copolymer.

3. The wiper lifter assembly of claim 1 wherein the wiper lifter assembly is a two part construction with the first part comprising the wiper ramp and the second part monolithically comprising the wiper contact member and the isolation pad.

4. The wiper lifter assembly of claim 1 wherein:
the upper surface of the wiper ramp has a first hole that receives an amount of the second material forming the wiper contact member; and,
the lower surface of the wiper ramp has a second hole that receives an amount of the second material forming the isolation pad.

5. The wiper lifter assembly of claim 1 wherein the groove has a longitudinal axis that is centered along a longitudinal axis of the wiper ramp.

6. The wiper lifter assembly of claim 1 wherein a ratio of T2/T1 is from 0 to 1.

7. An apparatus for use with an associated vehicle having a wiping surface comprising:
a wiper assembly comprising:
(A) a wiper blade mount that is pivotally attachable to the associated vehicle;
(B) a wiper blade supported to the wiper blade mount;
(C) wherein the wiper assembly is adjustable between:
(1) a use condition where the wiper blade mount moves the wiper blade to wipe the associated wiping surface; and, (2) a parked condition where the wiper blade mount does not move the wiper blade; and,
a wiper lifter assembly comprising:
(A) a wiper ramp having: (1) an upper surface including (a) a ramped portion that lifts the wiper blade away from the associated wiping surface when the wiper assembly is in the parked condition; and (b) a groove with a depth; and, (2) lower surface;
(B) a wiper contact member positioned on the upper surface of the wiper ramp, wherein the wiper blade mount contacts the wiper contact member directly and then the wiper ramp directly while overlapping the wiper contact member as the wiper assembly is adjusted from the use condition to the parked condition;
(C) an isolation pad having: (1) a first surface that contacts the lower surface of the wiper ramp; and, (2) a second surface that is attachable to the associated vehicle; and,
(D) wherein: (1) the wiper ramp is formed substantially of a first material; (2) the wiper contact member and the isolation pad are both formed substantially of a second material that is substantially softer than the first material; (3) the wiper contact member has a thickness T1, measured in a direction perpendicular to the wiper ramp upper surface at a location of measurement, that is greater than the depth of the groove; and (4) the wiper contact member is positioned in the groove such that the wiper contact member defines an extending thickness T2 extending beyond the upper surface of the wiper ramp.

8. The apparatus of claim 7 wherein the wiper lifter assembly is a two part construction with the first part comprising the wiper ramp and the second part monolithically comprising the wiper contact member and the isolation pad.

9. The apparatus of claim 8 wherein:
the first material is a thermoplastic composite comprising glass fibers and nylon; and,
the second material is a silicone copolymer.

10. The apparatus of claim 9 wherein:
the upper surface of the wiper ramp has a first hole that receives an amount of the second material forming the wiper contact member; and,
the lower surface of the wiper ramp has a second hole that receives an amount of the second material forming the isolation pad.

11. The apparatus of claim 10 wherein a ratio of T2/T1 is from 0 to 1.

12. The apparatus of claim 11 wherein the associated wiping surface is a windshield.

13. A vehicle comprising:
a frame;
a plurality of wheels mounted to the frame;
a locomotion source mounted to the frame that provides locomotion for the vehicle;
a passenger compartment having a windshield;
a wiper assembly comprising:
(A) a wiper blade mount that is pivotally attached to the vehicle;
(B) a wiper blade supported to the wiper blade mount;
(C) wherein the wiper assembly is adjustable between:
(1) a use condition where the wiper blade mount moves the wiper blade to wipe the windshield; and,
(2) a parked condition where the wiper blade mount does not move the wiper blade; and,
a wiper lifter assembly comprising:
(A) a wiper ramp having: (1) an upper surface including (a) a ramped portion that lifts the wiper blade away from the windshield when the wiper assembly is in the parked condition; and (b) a groove with a depth; and, (2) lower surface;
(B) a wiper contact member positioned on the upper surface of the wiper ramp, wherein the wiper blade mount contacts the wiper contact member directly and then the wiper ramp directly while overlapping the wiper contact member as the wiper assembly is adjusted from the use condition to the parked condition;
(C) an isolation pad having: (1) a first surface that contacts the lower surface of the wiper ramp; and, (2) a second surface that is attached to the vehicle near the windshield; and,
(D) wherein: (1) the wiper ramp is formed substantially of a first material; (2) the wiper contact member and the isolation pad are both formed substantially of a second material that is substantially softer than the first material; (3) the wiper contact member has a thickness T1, measured in a direction perpendicular to the wiper ramp upper surface at a location of measurement, that is greater than the depth of the groove; and (4) the wiper contact member is positioned in the groove such that the wiper contact member defines an extending thickness T2 extending beyond the upper surface of the wiper ramp.

14. The vehicle of claim 13 wherein the wiper lifter assembly is a two part construction with the first part comprising the wiper ramp and the second part monolithically comprising the wiper contact member and the isolation pad.

15. The vehicle of claim 13 wherein:
the first material is a thermoplastic composite comprising glass fibers and nylon; and,
the second material is a silicone copolymer.

16. The vehicle of claim 13 wherein:
the upper surface of the wiper ramp has a first hole that receives an amount of the second material forming the wiper contact member; and,
the lower surface of the wiper ramp has a second hole that receives an amount of the second material forming the isolation pad.

17. The vehicle of claim 13 wherein a ratio of T2/T1 is from 0 to 1.

18. The apparatus of claim 7 wherein the groove has a longitudinal axis that is centered along a longitudinal axis of the wiper ramp.

19. The vehicle of claim 13 wherein the groove has a longitudinal axis that is centered along a longitudinal axis of the wiper ramp.

* * * * *